United States Patent
Lynas et al.

(10) Patent No.: US 9,475,383 B2
(45) Date of Patent: Oct. 25, 2016

(54) AIRCRAFT FUEL TANK SYSTEM

(75) Inventors: Christopher Lynas, Bristol (GB); Peter William James, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 496 days.

(21) Appl. No.: 12/869,028

(22) Filed: Aug. 26, 2010

(65) Prior Publication Data

US 2011/0056974 A1    Mar. 10, 2011

(30) Foreign Application Priority Data

Sep. 4, 2009  (GB) .................................. 0915363.6

(51) Int. Cl.
| | | |
|---|---|---|
| B64G 1/00 | (2006.01) | |
| B60K 15/035 | (2006.01) | |
| B64D 37/10 | (2006.01) | |
| B64D 37/32 | (2006.01) | |

(52) U.S. Cl.
CPC ............ B60K 15/035 (2013.01); B64D 37/10 (2013.01); B64D 37/32 (2013.01); *B64D 2700/62447* (2013.01)

(58) Field of Classification Search
CPC ............ B60K 15/03504; B60K 15/04; B60K 15/035; B64D 2700/62456–2700/62464; F16K 24/04; F16K 17/00; F16K 17/16; A62C 4/00; F28F 9/0231; B65D 90/34
USPC ............... 220/562, 745, 746; 137/15.1, 587; 123/516; 244/135 R
See application file for complete search history.

(56) References Cited

U.S. PATENT DOCUMENTS

| | | | | |
|---|---|---|---|---|
| 3,371,497 A | * | 3/1968 | Singleton ...................... 62/46.1 |
| 3,643,690 A | * | 2/1972 | Sarai ............................. 137/587 |
| 6,216,791 B1 |   | 4/2001 | Alhamad |
| 7,648,103 B2 | * | 1/2010 | Barbosa et al. .......... 244/135 R |

FOREIGN PATENT DOCUMENTS

| | | |
|---|---|---|
| EP | 1591359 | 11/2005 |
| GB | 2008521 | 6/1979 |

OTHER PUBLICATIONS

UK Search Report for GB0915363.6 issued Dec. 31, 2009.

* cited by examiner

*Primary Examiner* — Fenn Mathew
*Assistant Examiner* — Kevin Castillo
(74) *Attorney, Agent, or Firm* — Hauptman Ham, LLP

(57) ABSTRACT

An aircraft fuel tank system is disclosed in which a vent tank is provided with an additional ullage vent for use, in combination with an eternal flamer barrier means, when refueling.

12 Claims, 5 Drawing Sheets

AIRCRAFT FUEL TANK SYSTEM

RELATED APPLICATIONS

The present application is based on, and claims priority from, Great Britain Application Number 0915363.6, filed Sep. 4, 2009, the disclosure of which is hereby incorporated by reference herein in its entirety.

FIELD OF INVENTION

The present invention relates to an aircraft fuel tank system.

BACKGROUND OF THE INVENTION

Fuel tank systems for aircraft commonly comprise one or more fuel tanks and a vent tank. The vent tank may also be referred to as a surge tank. The vent tank is arranged to provide venting means to vent the fuel tanks to atmosphere. Vent tanks are arranged to allow air to flow from atmosphere into the fuel tanks as they are drained and to allow air, fuel vapour or inerting gasses or a mixture of these to flow out of the tanks to atmosphere as the tanks are filled. In addition, during such fill or drain operations, vent tanks are also commonly required to equalize pressures in normal operation due to ambient pressure changes.

Vent tanks are commonly arranged with a predetermined liquid fuel storage capacity. This capacity provides storage for liquid fuel forced from the fuel tanks and vent system into the vent tank, for example, as a result of an aircraft manoeuvre or overfilling of the fuel tanks during refueling of the aircraft. While vent tanks are commonly arranged with means for returning such surges of fuel to the fuel tanks in a controlled manner, if the liquid fuel capacity of the vent tank is exceeded the fuel is vented to atmosphere.

One problem with such surges of liquid fuel is that they may be at a relatively high pressure during filling. If such pressure is not properly vented then the fuel tank system may be physically damaged. This is a particular problem if the fuel tank system comprises an integral part of the aircraft structure. The problem may be exacerbated when fuel is cold and thus more viscous and therefore more resistant to flow through the venting system.

Another problem exists in that fuel storage space in an aircraft is limited and valuable. Vent tanks may be located in areas that are not suitable for fuel storage and generally need to be as space efficient as possible while providing the required vent capacity. For example, vent tanks are commonly located in the wing tips of an aircraft where space, particularly depth, is restricted.

SUMMARY OF THE INVENTION

An embodiment of the invention provides an aircraft fuel tank system comprising:
a vent tank comprising an inlet from one or more fuel tanks and a first and second ullage vent means, the vent tank being arranged to provide a predetermined maximum fuel capacity and having a minimal ullage at the maximum fuel capacity;
a first vent pipe having a first open end in fluid communication with the first ullage vent means and a second open end positioned within the minimal ullage of the vent tank, the first vent pipe being arranged to provide fluid communication between the minimal ullage and the first ullage vent means;
a second vent pipe having a first open end in fluid communication with the second ullage vent means and a second open end positioned within the minimal ullage of the vent tank, the second vent pipe being arranged to provide fluid communication between the minimal ullage and the second ullage vent means; and
coupling means arranged for sealingly externally coupling an external flame barrier means to the second ullage vent so as to provide fluid communication between the second vent pipe and atmosphere via a coupled external flame barrier means.

The coupling means may be arranged for the removable coupling of an external flame barrier means. The second ullage vent may be provided with closure means operable to seal the second ullage vent. The closure means may be arranged to open in response to the engagement of an external flame barrier means with the coupling means. The second open end of the second vent pipe may be positioned at a higher level in the minimal ullage that the second open end of the first vent pipe. The second vent pipe may be positioned inboard of the first vent pipe. The first vent pipe may comprise internal flame barrier means. The first vent pipe may comprise ice screen means. The second ullage vent may be provided within the minimal ullage of the vent tank when the aircraft is level and the second vent pipe omitted. The second ullage vent may be positioned in the highest point in the minimal ullage when the aircraft is level.

An external flame barrier means for use with the aircraft fuel tank system may be provided, the external flame barrier means comprising:
a hollow body member comprising a first port providing coupling means for sealing engagement with the coupling means of the aircraft fuel tank system and a second port providing a vent to atmosphere; and
flame barrier means arranged within the body member so as to provide a barrier to ingress past the first port of a flame front external to the external flame barrier means and to enable egress of liquid fuel from the first port to atmosphere.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
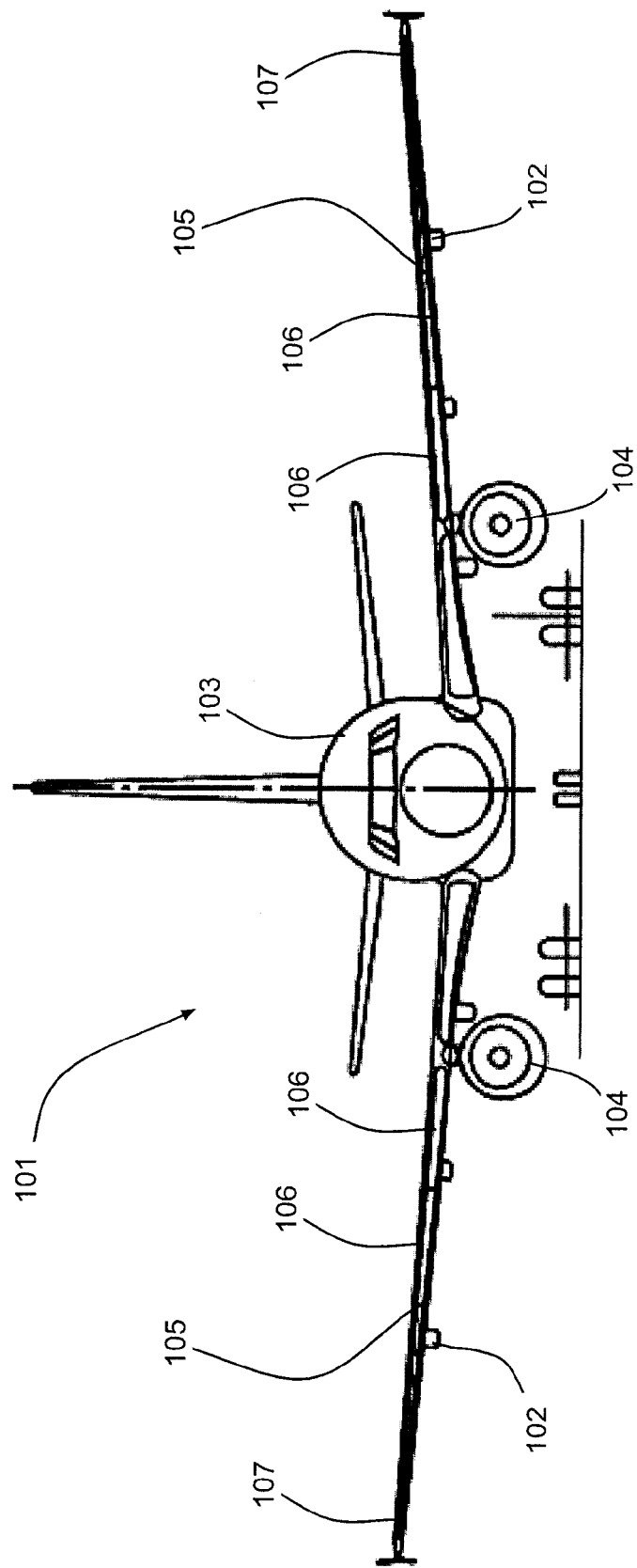
FIG. 1 is a schematic front view of an aircraft.

With reference to FIG. 1, an aircraft 101 comprises a pair of wings 102 faired into a fuselage 103. Each wing 102 carries an engine 104 and part of an internally located fuel tank system 105. The fuel tank system 105 provides fuel to the engines 104. The fuel tank system comprises a set of fuel tanks 106 and two vent tanks 107 each built-in to a respective one of the wings 102. The vent tanks 107 are each located towards the tip of their respective wings 102. The vent tanks 107 are arranged to perform a number of functions. Firstly, the vent tanks 107 vent the ullage of each of the fuel tanks 106 to atmosphere to enable the ingress of air required to equalise negative pressure in the fuel tanks as a result of, for example, fuel being burned by the engines 104 or a decrease in altitude of the aircraft 101. Secondly, the vent tanks 107 vent the ullage of each of the fuel tanks 106 to atmosphere to enable the egress of positive pressure of air, fuel vapour or inerting gasses from the tanks as a result, for example, of an increase in ambient temperature or altitude of the aircraft 101. Thirdly, the vent tanks 107 are arranged to vent excess liquid fuel from the fuel tanks 106 to atmosphere as a result of, for example, exceptional manoeuvres of the aircraft 101 or by overfilling of the fuel tanks 106 during a refueling process.

Figure 2:
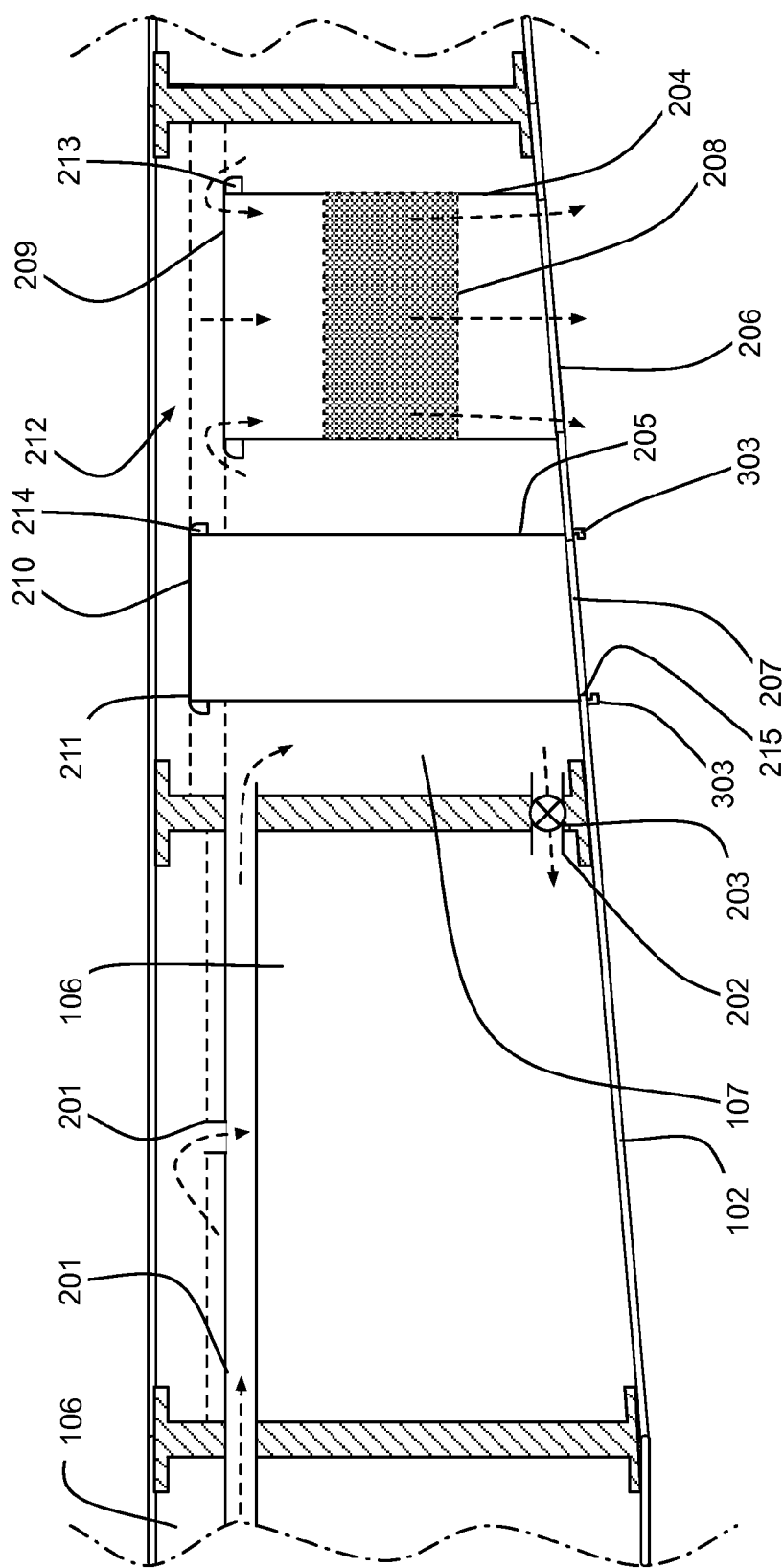
FIG. 2 is a cross-sectional front view of a vent tank in the fuel tank system of the aircraft of FIG. 1.

With reference to FIG. 2, in the present embodiment two fuel tanks 106 and the vent tank 107 are provided by the internal structure of each of the wings 102. The fuel tanks 106 are arranged with a ventilation system comprising a first set of conduits 201 for venting the ullage of each respective fuel tank 106 into the vent tank 107. The fuel and vent tanks 106, 107 are further provided with a fuel return system comprising a second set of conduits 202 controlled by pumps 203 having non-return valves that enable the controlled return of fuel from the vent tank 107 to the fuel tanks 106.

The vent tank 107 further comprises first and second vent pipes 204, 205 arranged to provide fluid communication between the interior of the vent tank 107 and atmosphere via respective first and second ullage vents 206, 207 positioned in the lower wall of the ullage tank 107 and the aircraft wing 102. In the present embodiment, the vent pipes 204, 205 are cylindrical and arranged vertically within the vent tank 107 when the aircraft 101 is level. The vent pipes 204, 205 each have their respective lower open ends in direct fluid communication with the first and second ullage vents 206, 207. In the present embodiment, the second vent pipe 205 is positioned inboard of the first vent pipe 204 within the vent tank 107. The first vent pipe 204 further comprises a flame barrier means 208 arranged to prevent an external flame front from entering the vent tank 107 via the first ullage vent 206 and vent pipe 204.

In the present embodiment, the upper open end 209 of the first vent pipe 204 is positioned level with the maximum designed liquid fuel level 211 of the vent tank 107. The upper open end 210 of the second vent pipe 205 is positioned above that of the first vent pipe at a position generally midway between the maximum designed liquid fuel level 211 and the upper wall of the vent tank 107. The space in the vent tank 107 above the maximum designed fuel level 211 is the minimal ullage 212. In the present embodiment, the upper end 206, 207 of each vent pipe 204, 205 is provided with a lip 213, 214.

In the present embodiment, the second ullage vent 207 is fitted with a removable closure means in the form of a removable hatch 215. When fitted, the hatch 215 is arranged to seal the second ullage vent 207 and thus prevent ingress or egress of fluid to or from the vent tank 107 via the second vent pipe 205. When the hatch 215 is removed from the second ullage vent 207, fluid communication is provided between the ullage 212 and atmosphere via the second vent pipe 205.

Figure 3:
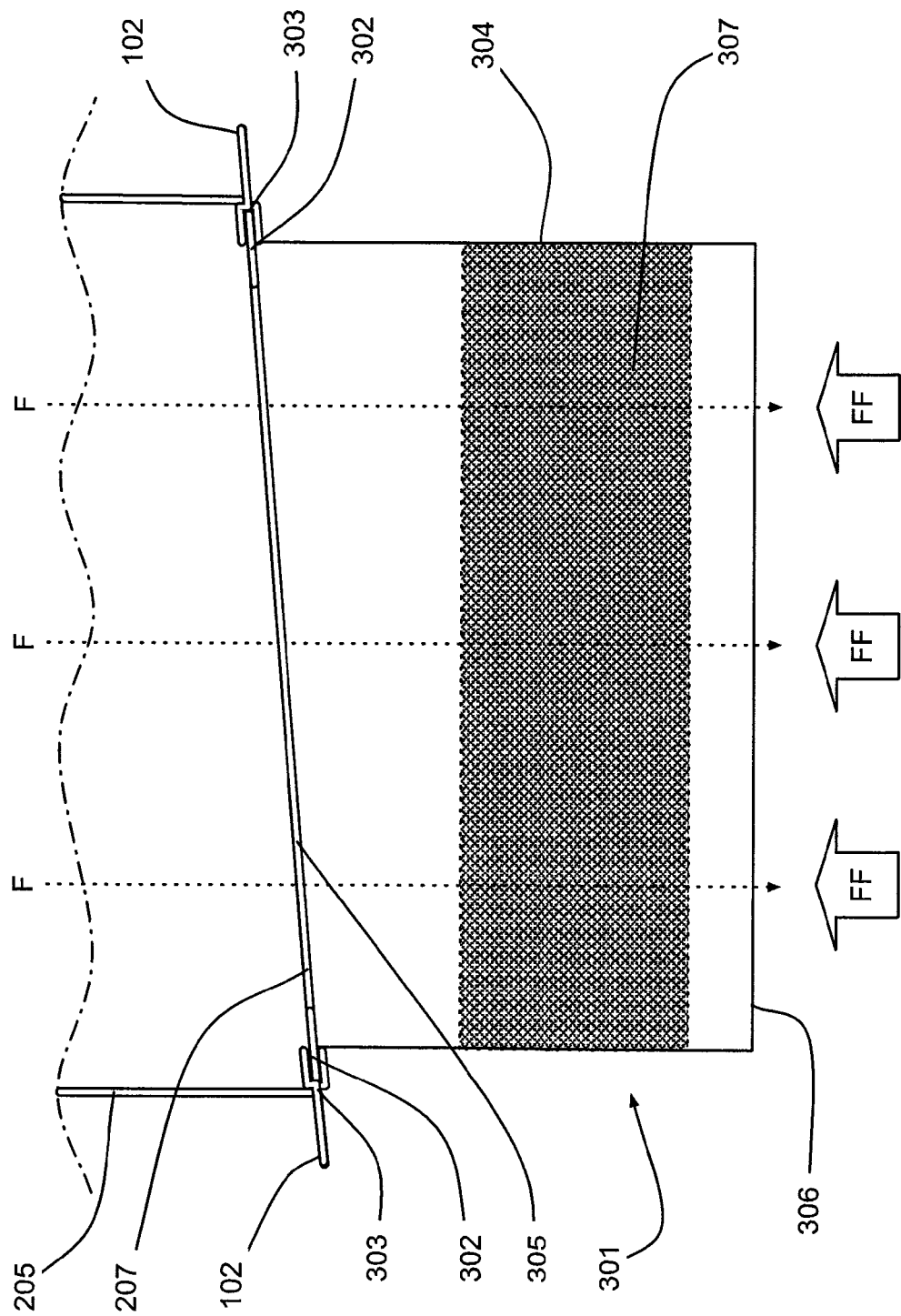
FIG. 3 is a schematic cross-sectional view of an external flame barrier means for use with the vent tank of FIG. 2.

The vent tanks 107 are arranged for use in two modes. The first mode is arranged for venting of the vent tanks 107 when no refueling is taking place. In this first mode, the hatch 215 is fixed within the second ullage vent 207 and all venting of the vent tank 107 is provided by the first vent pipe 204 and first ullage vent 206. The second mode is arranged for venting of the vent tanks 107 during a refueling process. In this second mode, with reference to FIG. 3, the hatch 215 is removed from the second ullage vent 207 and an external flame barrier means 301 is coupled to the second ullage vent 207. The coupling is provided by male coupling means 302 complimentary to female coupling means 303 provided, in the present embodiment, in the second ullage vent 207.

The external flame barrier means 301 comprises a hollow substantially cylindrical body member 304 having a first and second open ends 305, 306. The first open end 305 is arranged to conform to the second ullage vent 207 and carries the male coupling means 302 in the from a male part of a bayonet coupling. The second ullage vent 207 provides the complimentary female part of the bayonet coupling. The second open end 306 is open to atmosphere. The external flame barrier means 301 further comprises a flame barrier element 307 fixed within the body member 304. The flame barrier element is arranged to provide a flame barrier for preventing ingress, via the external flame barrier means 301, of a flame front (FF) external to the vent tank 107.

Thus, in the first mode, if liquid fuel from the fuel tanks 106 fills the vent tank 107 over its maximum designed liquid fuel level 211, the liquid fuel overflows the lip 213 of the first vent pipe 204 and flows down the first vent pipe 204 into the atmosphere via the first ullage vent 205. In the first mode, the hatch 215 prevents any fuel egress from second ullage vent 207. In the second mode, the hatch 215 is replaced with the external flame barrier means 301 so as to provide additional ventilation for the vent tank 107 via the second vent pipe 205. In the second mode, if the rate of liquid fuel entry to the vent tank 107 exceeds the liquid venting flow rate of the first vent pipe 204 then the level of fluid in the vent tank 107 will rise past the maximum designed liquid fuel level 211 until the liquid fuel overflows the lip 214 of the second vent pipe 205, flows down the second vent pipe 205, through the external flame barrier means 301 and to atmosphere via the second ullage vent 206. Thus, in the second mode, excess liquid fuel from the vent tank 107 may be vented via the first and second vent pipes 204, 205 simultaneously.

In the present embodiment, the flame barrier elements 208, 307 are formed from a conventional flame barrier material such as layered wire mesh. As will be understood by those in the art, the flame barrier may be formed from any suitable material such as non-woven meshes or may comprise one or more granular or particulate layers.

Figure 4:
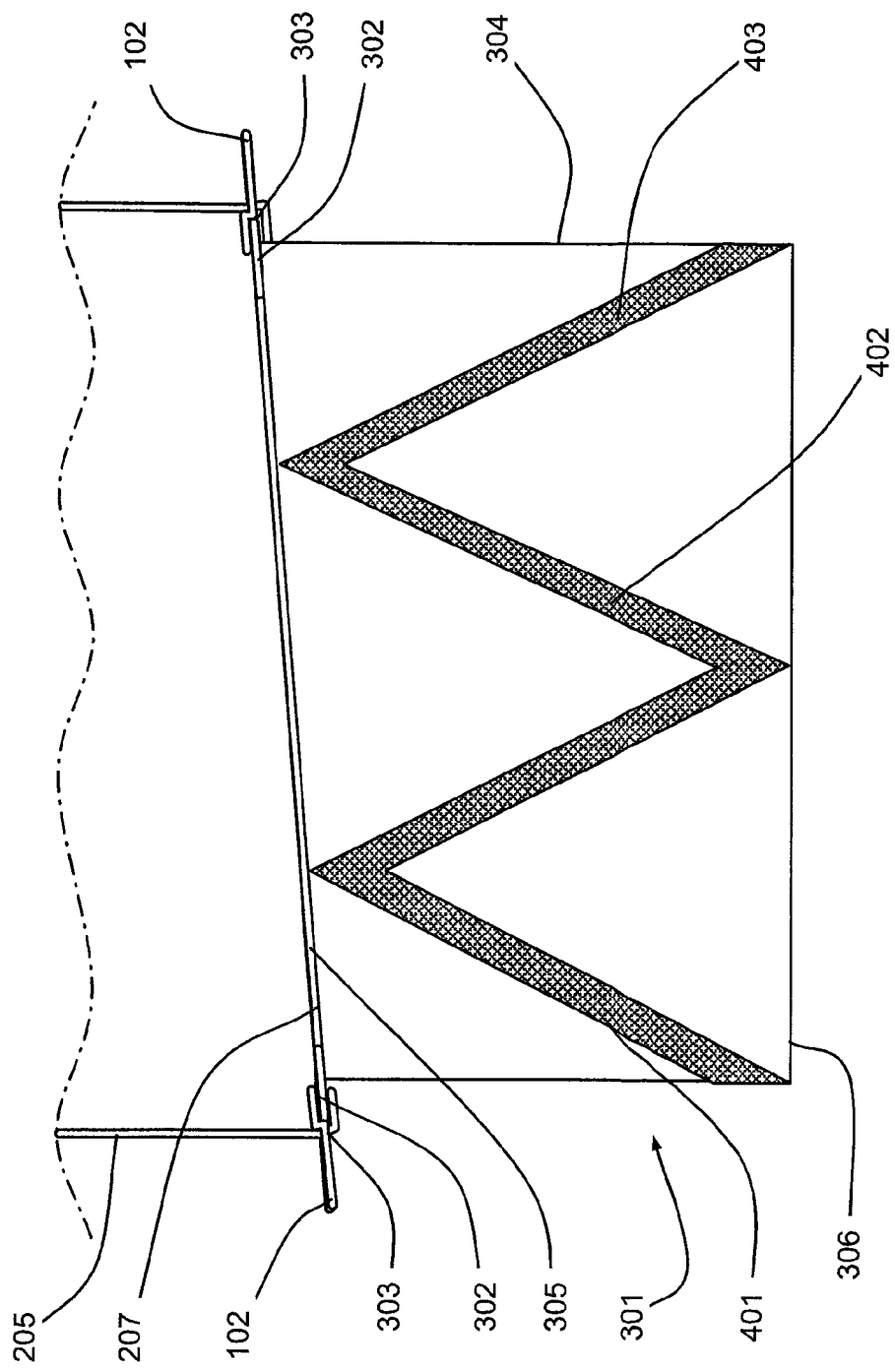
FIGS. 4 & 5 are cross-sectional views of external flame barrier means in accordance with further embodiments.

With reference to FIG. 4, in another embodiment, the external flame barrier means 301 comprises a semi-inverted cone shaped flame barrier element 401. In other words, only the head half 402 of the cone is inverted relative to the base half 403 of the cone thus providing a circumferentially corrugated cross-section relative to the central axis of the external flame barrier means 301. Given the body member 304 with and internal diameter of 250 mm and a height of 180 mm, the flame barrier element 401 of the present embodiment provides a surface area of approximately 0.1497 m$^2$ of flame barrier surface to liquid fuel vented from the vent tank 107. Arranging the flame barrier element 307, as in FIG. 3, as a single disk normal to the central axis of a 250 mm body member 304, an area of approximately 0.0491 m$^2$ of planar flame barrier surface is provided. Thus the present embodiment provides an increase in surface area of approximately 200% over the single disk type of flame barrier element 307 of FIG. 3.

Figure 5:
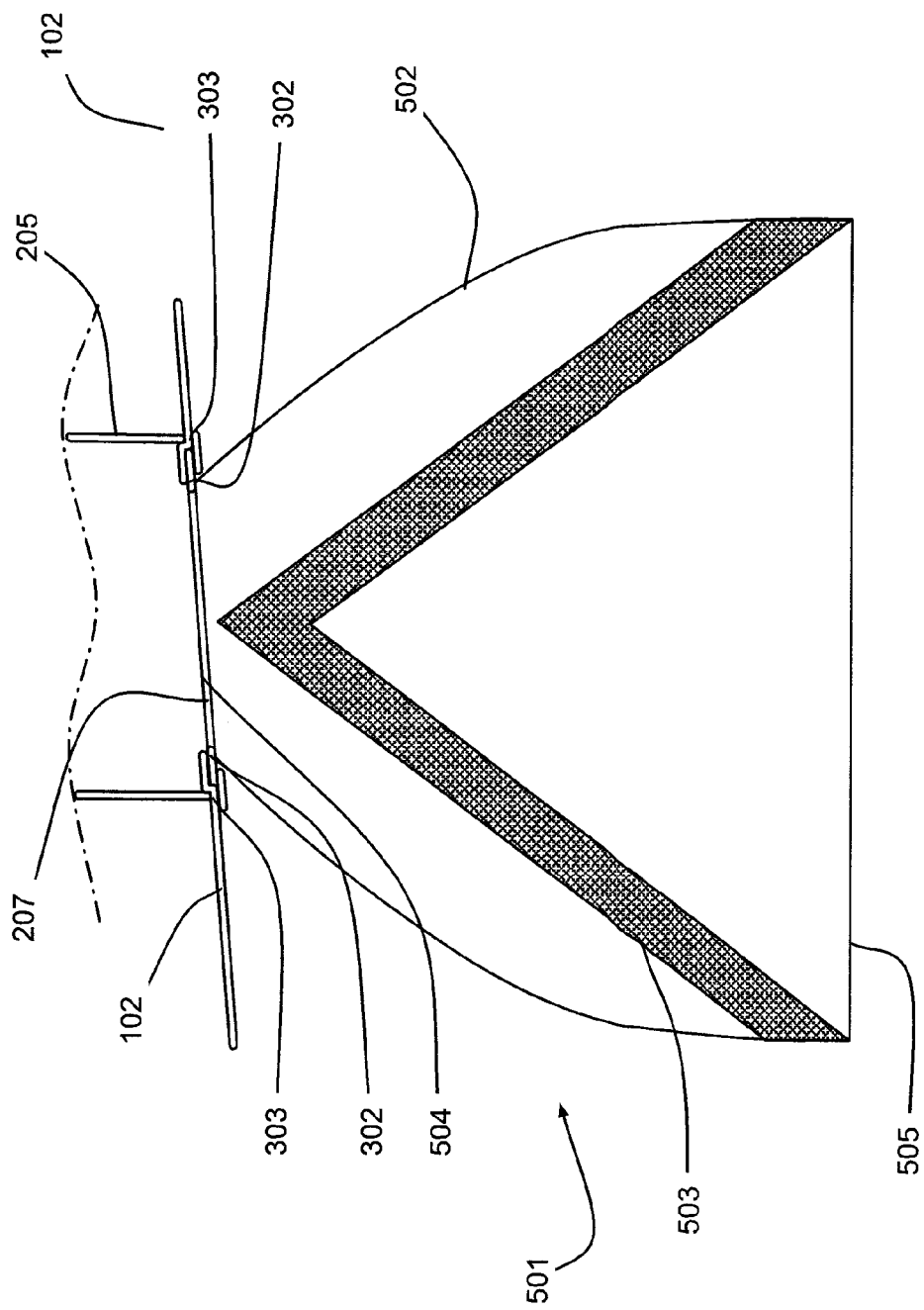

With reference to FIG. 5, in a further embodiment, an external flame barrier means 501 comprises a hollow bell shaped body member 502 carrying a single upright conical flame barrier element 503. The body member 502 comprises an upper and lower open ends 504, 505. The upper open end 504 is of substantially the same diameter as the second ullage vent 207 and carries male coupling means 302. The lower open end 505 provides a vent to atmosphere of approximately 2.5 times the diameter of the second ullage vent 207. The present embodiment provides an external flame barrier means 501 that enables a larger flame barrier element 503 to be provided for a given size of second ullage vent 207 so as to provide a corresponding increase in fluid flow through the external flame barrier means 501.

In another embodiment, the second vent pipe is provided with a drain to remove fuel in the second vent pipe prior to fitting of an external flame barrier means so as to reduce fuel spillage. The drain may operate by gravity or comprise a pump to remove fuel from the second vent pipe. The drain may further comprise a non-return valve. In another embodiment, the external flame barrier means is provided with or used in conjunction with a reservoir arranged to capture fuel released from the second vent pipe on attachment the external flame barrier means to the second ullage vent.

In a further embodiment, the second ullage vent is provided with a self-opening/closing hatch arranged to operate in response to the insertion of an external flame barrier means into the second ullage vent. In other words, insertion or attachment of the external flame barrier means in the second ullage vent causes the hatch to open automatically. Correspondingly, removal of the external flame barrier means causes the hatch to close automatically. In the present embodiment, the automatic hatch is biased into its closed position and opened by the mechanical force of the insertion of the external flame barrier means. As will be understood by those in the art, the automatic hatch may be powered or biased by any suitable means such as electrical or hydraulic systems. The self-opening/closing hatch may be arranged to automatically operate a drain for the second vent pipe prior to opening so as to automatically remove fuel from the second vent pipe prior to it being opened to atmosphere.

In another embodiment, the second ullage vent is provided in an upper wall of the vent tank and thus the upper surface of the aircraft wing. In this embodiment, the second ullage vent does not require a vent pipe as it is situated within the minimal ullage of the vent tank. In the present embodiment an external flame barrier means may be attached directly to the second ullage vent on the upper side of the wing. Alternatively, the external flame barrier means may be attached via an intermediate conduit such as a hose or pipe for conducting any fuel flowing from the second ullage vent away from the aircraft structure.

As will be understood by those skilled in the art, in any of the embodiments described herein, an intermediate conduit such as a hose or pipe may be provided between the second ullage vent and the external flame barrier means so as to conduct any liquid fuel flowing from the second ullage vent away from the aircraft structure.

As will be understood by those skilled in the art, the hatch for the second ullage vent may be provided with a locking or retaining means to prevent accidental or unauthorised opening. The locking or retaining mechanism may also be operable for the external flame barrier means when in engagement with the second ullage vent either directly or indirectly via a hose or pipe.

The external flame barrier means in combination with the second ullage vent and vent pipe may be arranged so as to provide comparable or greater fluid flow than refueling means/pump. This arrangement will reduce the risk of the refueling pump increasing the pressure within the fuel tank system beyond its structural limits and thus avoid damage to the aircraft structure. The external flame barrier means may be arranged for use during high rate refueling, whereas during lower pressure or standard refueling operations only the internal vent pipe is utilized.

As will be understood by those skilled in the art, the coupling means between the external flame barrier means and the second ullage vent may be provided by any suitable coupling means such as correspondingly threaded male and female members, push or snap-fit connectors or any other coupling means suitable for carrying fuel.

As will be understood by those skilled in the art, the first ullage vent may be provided with an ice screen.

As will be understood by those in the art, any surface of one or more of the flame barrier elements may be corrugated or be formed with a convoluted cross section. Such corrugations or convolutions may run in any suitable direction through the flame barrier elements. For example, the corrugations or convolutions may run radially or circumferentially relative to the central axis of the corresponding external flame barrier means.

As will be understood by those in the art, the first ullage vent may be fed by or feed into an aerodynamic duct, such as a NACA (National Advisory Committee for Aeronautics) duct or the like, for providing an aerodynamic interface between the first ullage vent and the external surface of the aircraft.

Embodiments of the invention may enable the first vent pipe and flame barrier arrangements to be more compact since the first vent pipe need only be capable of the relatively low flow rates required when the aircraft is operating in modes other than the refueling mode.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. An aircraft fuel tank system, comprising:
    one or more aircraft fuel tanks holding and supplying aircraft fuel to aircraft engines within said aircraft;
    an aircraft surge tank comprising an inlet from said one or more aircraft fuel tanks and a first ullage vent opening and a second ullage vent opening, said aircraft surge tank being arranged to provide a predetermined maximum fuel capacity and having a minimal ullage at said maximum fuel capacity;
    a first vent pipe having a first open end in fluid communication with said first ullage vent opening and a second open end positioned within said minimal ullage of said surge tank, said first vent pipe being arranged to provide fluid communication between said minimal ullage and said first ullage vent opening;
    a second vent pipe having a first open end in fluid communication with said second ullage vent opening and a second open end positioned within said minimal ullage of said surge tank, said second vent pipe being arranged to provide fluid communication between said minimal ullage and said second ullage vent opening; and
    a coupling mechanism sealingly externally coupling an external flame barrier to said second ullage vent opening so as to provide fluid communication between said second vent pipe and atmosphere via the coupled external flame barrier, and wherein said external flame barrier is permanently open to fluid flow.

2. An aircraft fuel tank system according to claim 1 in which said coupling is arranged for the removable coupling of the external flame barrier.

3. An aircraft fuel tank system according to claim 1 in which said second ullage vent opening is provided with a closure operable to seal said second ullage vent.

4. An aircraft fuel tank system according to claim 3 in which said closure is arranged to open in response to the engagement of an external flame barrier with said coupling mechanism.

5. An aircraft fuel tank system according to claim 1 in which said second open end of said second vent pipe is positioned at a higher level in said minimal ullage that said second open end of said first vent pipe.

6. An aircraft fuel tank system according to claim 1 in which said second vent pipe is positioned inboard of said first vent pipe.

7. An aircraft fuel tank system according to claim 1 in which said first vent pipe comprises an internal flame barrier.

8. An aircraft fuel tank system according to claim 1 in which said first vent pipe comprises an ice screen.

9. An aircraft fuel tank system according to claim 1 in which said second ullage vent opening is provided within said minimal ullage of said surge tank when said aircraft is level and said second vent pipe is omitted.

10. An aircraft fuel tank system according to claim 9 in which said second ullage vent is positioned in the highest point in said minimal ullage when said aircraft is level.

11. An aircraft fuel tank system, comprising:
a surge tank comprising an inlet from one or more fuel tanks and a first and second ullage vent means, said surge tank being arranged to provide a predetermined maximum fuel capacity and having a minimal ullage at said maximum fuel capacity;
a first vent pipe having a first open end in fluid communication with said first ullage vent means and a second open end positioned within said minimal ullage of said surge tank, said first vent pipe being arranged to provide fluid communication between said minimal ullage and said first ullage vent means;
a second vent pipe having a first open end in fluid communication with said second ullage vent means and a second open end positioned within said minimal ullage of said surge tank, said second vent pipe being arranged to provide fluid communication between said minimal ullage and said second ullage vent means; and
coupling means arranged for sealingly externally coupling an external flame barrier means to said second ullage vent means so as to provide fluid communication between said second vent pipe and atmosphere via a coupled external flame barrier means, wherein said external flame barrier means is formed from a layered wire mesh material.

12. An aircraft fuel tank system, comprising:
a surge tank comprising an inlet from one or more fuel tanks and a first and second ullage vent means, said surge tank being arranged to provide a predetermined maximum fuel capacity and having a minimal ullage at said maximum fuel capacity;
a first vent pipe having a first open end in fluid communication with said first ullage vent means and a second open end positioned within said minimal ullage of said surge tank, said first vent pipe being arranged to provide fluid communication between said minimal ullage and said first ullage vent means;
a second vent pipe having a first open end in fluid communication with said second ullage vent means and a second open end positioned within said minimal ullage of said surge tank, said second vent pipe being arranged to provide fluid communication between said minimal ullage and said second ullage vent means; and
coupling means arranged for sealingly externally coupling an external flame barrier means to said second ullage vent means so as to provide fluid communication between said second vent pipe and atmosphere via a coupled external flame barrier means, wherein said external flame barrier means is formed from a non-woven mesh material.

* * * * *